(12) United States Patent
Witte et al.

(10) Patent No.: US 12,717,102 B2
(45) Date of Patent: Aug. 25, 2026

(54) OPTICAL FIBER SYSTEM FOR GENERATING A SIDE-EMITTING SCATTERED LASER RADIATION FROM A COUPLED OPTICAL LASER RADIATION, AND ASSOCIATED LASER SYSTEM

(71) Applicant: Laserline Gesellschaft fur Entwicklung und Vertrieb von Diodenlasern mbH, Mulheim-Karlich (DE)

(72) Inventors: Ulrich Witte, Mulheim-Karlich (DE); Simon Britten, Fraunhofer Strasse (DE); Christoph Ullmann, Mulheim-Karlich (DE)

(73) Assignee: LASERLINE GESELLSCHAFT FUR ENTWICKLUNG UND VERTRIEB VON DIODENLASERN MBH, Mulheim-Karlich (DE)

( * ) Notice: Subject to any disclaimer, the term of this patent is extended or adjusted under 35 U.S.C. 154(b) by 358 days.

(21) Appl. No.: 18/356,602

(22) Filed: Jul. 21, 2023

(65) Prior Publication Data

US 2024/0027712 A1 Jan. 25, 2024

(30) Foreign Application Priority Data

Jul. 25, 2022 (DE) ......................... 102022118512.5

(51) Int. Cl.
*G02B 6/42* (2006.01)
*F21V 8/00* (2006.01)
(Continued)

(52) U.S. Cl.
CPC ........... *G02B 6/4296* (2013.01); *G02B 6/001* (2013.01); *G02B 6/02052* (2013.01);
(Continued)

(58) Field of Classification Search
CPC ............. G02B 6/4296; G02B 6/02052; G02B 6/3801; G02B 6/262; G02B 6/4292; G02B 6/001; F21V 2200/15
See application file for complete search history.

(56) References Cited

U.S. PATENT DOCUMENTS 10,156,672 B2 12/2018 Benjamin et al.
2013/0088888 A1* 4/2013 Fewkes .................. G02B 6/001 362/558
2020/0081182 A1 3/2020 Hawke et al.

FOREIGN PATENT DOCUMENTS

JP 11-281819 A * 10/1999 ............. G02B 6/001

OTHER PUBLICATIONS

Imamura et al., Machine Translation of JP 11-281-819 A, Oct. 15, 1999. (Year: 1999).*

(Continued)

*Primary Examiner* — Michelle R Connelly
(74) *Attorney, Agent, or Firm* — WELSH FLAXMAN & GITLER LLC

(57) ABSTRACT

The invention relates to an optical fiber system for generating a side-emitting optical scattered laser radiation from a coupled optical laser radiation consisting of at least one side-emitting optical fiber with a fiber input and a fiber output, wherein the side-emitting optical fiber has at least one fiber core, a scattering layer surrounding the fiber core, and at least one cladding layer surrounding the scattering layer, wherein by the scattering layer, side-emitting scattered laser radiation is generated from the optical laser radiation coupled into the optical fiber, and wherein a coupling-side connecting section of the side-emitting optical fiber at the fiber input is received in a fiber connector and to produce a mechanical connection to the fiber connector. Particularly, at least the scattering layer and the at least one cladding layer (Continued)

are removed by stripping to suppress the side-emitting scattered laser radiation in the connecting section at the free end.

21 Claims, 7 Drawing Sheets

(51) Int. Cl.
*G02B 6/02* (2006.01)
*G02B 6/26* (2006.01)
*G02B 6/38* (2006.01)

(52) U.S. Cl.
CPC ........... *G02B 6/262* (2013.01); *G02B 6/3801* (2013.01); *G02B 6/3861* (2013.01); *G02B 6/4292* (2013.01)

(56) References Cited

OTHER PUBLICATIONS

German Office Action dated Mar. 6, 2023 with partial English translation.

* cited by examiner

OPTICAL FIBER SYSTEM FOR GENERATING A SIDE-EMITTING SCATTERED LASER RADIATION FROM A COUPLED OPTICAL LASER RADIATION, AND ASSOCIATED LASER SYSTEM

BACKGROUND OF THE INVENTION

The invention relates to an optical fiber system for generating a side-emitting scattered optical laser radiation from a coupled optical laser radiation and associated laser system.

Usually, in laser systems, the place of beam generation and the place of laser processing, i.e., the application of a generated optical laser radiation, are separated from each other. In this case, the transport of the generated optical laser radiation is carried out via an optical fiber system configured for this purpose.

Optic fibers, also known as glass fibers, optical waveguides, or optical fibers, are used in a wide variety of embodiments to transmit optical laser radiation via such an optical fiber system.

Such optical fibers are substantially made of quartz glass and, depending on the length of the transmission path, also of suitable plastics and have a fiber core, a cladding layer surrounding the fiber core, and at least one buffer or jacket for protection against external influences, in particular mechanical damage to the fiber core. Many different configurations of such optical fibers are known, for example, single-mode fibers, multi-mode fibers, NZDS (non-zero dispersion-shifted) fibers, and other special fibers.

For coupling in and out the optical radiation or laser radiation, the optical fiber has a fiber connector on the input side and preferably also on the output side, which forms a mechanical interface to a laser source or a laser coupling unit. The respective free end of the optical fiber is preferably fixed in the fiber connector using an adhesive. The cladding layer and/or jacket of the optical fibers usually prevents side and/or radial emission of radiation from the optical fiber.

However, optical fibers are already known which specifically allow side or radial emission of optical radiation from the optical fiber. The optical radiation transported by the optical fiber along the propagation direction is scattered using a scattering layer provided in the optical fiber which, for example, comprises special nanoparticles or plastic particles or defined defects in such a manner that as a result of this, a side emission of the optical radiation from the optical fiber oriented radially to the propagation direction of the optical radiation is produced, which is also referred to as scattered laser radiation. Such side-emitting optical fibers are already used, among other things, for illumination purposes, but only for low-power optical radiation in the range of a few milliwatts. Such side-emitting optical fibers allow the implementation of uniform lighting effects in product design or also so-called "ambiance" lighting.

The structure of such a side-emitting optical fiber with a central fiber core made of glass and a polymer-based cladding layer with light-scattering materials is known, for example, from U.S Patent Application Publication No. 2018/16100844A, although different embodiments certainly exist.

Such side-emitting optical fibers can also be used in the field of photochemistry, horticulture, heat and/or polymer treatment, as well as biochemistry, process engineering, and drying technology. For example, U.S. Pat. No. 10,258,957 B2 describes a structure of a photochemical reactor that allows irradiation of a flow reactor using a rigid light-emitting rod. For this purpose, the reactor rod has a side-emitting optical fiber that provides the desired scattered laser radiation.

U.S. Pat. No. 10,156,672 B2 already discloses a fiber connector arrangement for a side-emitting optical fiber in which, to connect the side-emitting optical fiber to a fiber connector, the outer cladding layer of the optical fiber is removed and subsequently the exposed section of the optical fiber, including the scattering layer, is adhesively bonded in a cylindrical connecting element ("ferrule") made of ceramic using an adhesive, preferably an epoxy adhesive. Due to the scattering layer still present in the connecting area, side-emitting radiation also occurs there. Disadvantageously, when optical radiation with a high power of several watts to several kilowatts is coupled in, the coupled radiation is also scattered laterally in the plug-in or connecting area, as a result of which the fiber connector is heated. Depending on the level of power of the coupled optical radiation and the attenuation properties of the optical fiber, this can result in detrimental destruction of the fiber and the fiber connector. It can also cause the adhesive to heat up, resulting in faster aging, in particular in the case of epoxy adhesives.

Using a high-power radiation source also makes it possible, for example, to create a "cold", homogeneously emitting, and approximately freely formable light source, which could be used in photoreactor systems, for example. However, the coupling of the high-energy optical radiation in the visible or near-infrared spectral range into such a side- or radial-emitting optical fiber, in particular into the fiber ends at the free end thereof or the fiber connectors provided there, is also problematic.

SUMMARY OF THE INVENTION

Based on this, it is an object of the invention to provide an optical fiber system of side-emitting optical scatter laser radiation from a coupled optical laser radiation with high power, which avoids the disadvantages described above, in particular, allows an improved coupling of high-energy optical laser radiation into a side-emitting optical fiber.

Advantageous refinements, details, and configurations of the invention are apparent from the dependent claims, the description, and the drawings.

For this purpose, the optical fiber system according to the invention comprises at least one side-emitting optical fiber having a fiber input and a fiber output, wherein the side-emitting optical fiber has at least one fiber core, a scattering layer surrounding the fiber core, and at least one cladding layer surrounding the scattering layer. As a result of the scattering layer, a side-emitting scattering laser radiation is generated from the optical laser radiation coupled into the optical fiber, and wherein a coupling-side connecting section of the side-emitting optical fiber is formed at the fiber input for reception in a fiber connector and for producing a mechanical connection to the fiber connection. Particularly advantageously, at least the scattering layer and the at least one cladding layer are removed by stripping to suppress a side-emitting scattered laser radiation in the connecting section at the free end. In this manner, the generation of the scattered laser radiation in the coupling region of the optical fiber system is suppressed in a targeted manner, thereby effectively preventing damage to the fiber and/or the fiber connector connected to the fiber.

Preferably, the optical fiber system according to the invention comprises at least one fiber connector that is mechanically connected to the stripped connecting section at the free end of the side-emitting optical fiber. In a preferred embodiment, the fiber connector is connected both mechanically and thermally to the stripped connecting section at the free end, namely using an adhesive bond. Preferably, an organic adhesive is used to produce the adhesive bond. Particularly advantageously, the adhesive bond is not exposed to scattered laser radiation, so premature aging of the adhesive bond is avoided.

Further advantageously, the stripped connecting section at the free end is received at least in sections in a cylindrical connecting piece of the fiber connector and adhesively bonded thereto. Particularly advantageously, a detachable connection between fiber and fiber connector is thereby possible.

In a refinement of the invention, at least one fiber coupling unit is provided with a fiber receptacle on the input side and a fiber receptacle on the output side, wherein the fiber receptacles are designed to produce a mechanical plug-in connection with the fiber connector. The fiber coupling unit is particularly preferably in the form of a free-jet coupling element, which is implemented, for example, in the form of a “fiber-fiber coupler”. Via the fiber coupling unit, the optical fiber system according to the invention can be connected to a laser source or an upstream transport fiber with only minor power losses.

Further advantageously, the fiber connector and/or the fiber coupling unit (4) have a temperature, plug-in, and/or breakage monitoring device. The optical fiber system according to the invention is thus configured to provide various monitoring functions for increasing the operational reliability of an associated laser system.

According to another advantageous embodiment of the invention, the connecting section at the free end between the side-emitting optical fiber and the fiber connector forms an opto-mechanical interface for coupling high-energy optical laser radiation. For this purpose, the fiber connector is implemented in the form of the LLK-D-type connector. Due to the use of a standardized fiber connector and associated fiber coupling units, the optical fiber system according to the invention can also be retrofitted to existing systems without any problems.

Particularly advantageously, the side-emitting optical fiber is designed to be flexible in such a manner that it can be bent within a bending radius of between 50 mm and 500 mm without causing damage. This allows the fiber to be adapted to individual lighting requirements.

According to a preferred embodiment, the scattering layer is made of plastic material, preferably acrylate, and comprises a plurality of scattering elements by which the side- or radial-emitting scattering laser radiation is generated from the optical laser radiation transported in the fiber core. The scattering elements are made of a ceramic material, for example, aluminum oxide, and the plastic material used to produce the scattering layer is correspondingly enriched with the scattering elements made of a ceramic material, in particular aluminum oxide.

Further advantageously, the fiber connector and/or the side-emitting optical fiber can be liquid-cooled, in particular water-cooled. Therefore, the fiber connector is preferably made of plastic or metal. For liquid or water cooling of the fiber connector, cooling channels are provided, for example, and/or the side-emitting optical fiber is received in an enveloping cladding layer, which is preferably of a tubular design. This additionally effectively prevents excessive heat generation in the connecting area and damage to the fiber connector and/or the fiber resulting therefrom.

According to another embodiment of the invention, the side-emitting optical fiber has a fiber facet on the coupling side, upstream of which a pinhole element having a pinhole is arranged. By using a pinhole, the entry of unwanted laser radiation into the fiber connector or the fiber connector/fiber connecting area can additionally be avoided.

Further advantageously, at least a segment of the stripped connecting section at the free end of the side-emitting optical fiber is provided with a new cladding layer made of plastic material without scattering elements. Thus, a part of the optical fiber can be used as a pure transport fiber without scattering effect.

According to a refinement of the invention, an end cap element is arranged on the output side or at the fiber output of the side-emitting optical fiber. The end cap element forms a spherical mirror that reflects portions of the laser radiation emerging on the output side back into the side-emitting optical fiber. Since the power of the laser radiation decreases strongly on the output side, the end cap allows a more homogeneous power distribution of the scattered laser radiation in the z-direction. For this purpose, the end cap element can be formed, for example, by a highly reflective spherical or paraboloidal end cap.

In an advantageous embodiment, the side-emitting optical fiber is received at least in sections in a process chamber and at least the section of the side-emitting optical fiber received in the process chamber is arranged in a spiral. This allows the generation of homogeneous scattered laser radiation in the process chamber and effective, uniform irradiation of workpieces, components or chemicals in the process chamber.

In addition, an inner side of the process chamber or an enclosure receiving the side-emitting optical fiber can be reflective. As a result, a further increase in the degree of homogenization is achieved.

Particularly preferably, the optical laser radiation is high-energy and has a power of several watts, preferably between 50 watts and 10,000 watts of power and/or a wavelength of 200 nm to 1,500 nm.

Furthermore, a subject matter of the invention is a laser system comprising at least one laser source for providing an optical laser radiation and an optical fiber system according to the invention for generating a side-emitting optical scattered laser radiation from the optical laser radiation coupled into the optical fiber, which has at least one fiber coupling unit for coupling the optical laser radiation provided by the laser source into the side-emitting optical fiber or its fiber connector of the optical fiber system.

Here, particularly advantageously, the laser source is formed by a semiconductor laser or a semiconductor laser array, in particular a diode laser or a diode laser arrangement. The transport fiber preferably has a passive beam-guiding optical fiber and a fiber connector on the coupling-in and coupling-out side, wherein the laser source, the transport fiber and the optical fiber system are connected in series.

Refinements, advantages and application possibilities of the invention are also apparent from the following description of exemplary embodiment and from the figures. In this connection, all the features described and/or illustrated in the drawings are in principle the subject matter of the invention, either individually or in any combination, irrespective of their summary in the claims or their relation. Also, the content of the claims is made a part of the description.

BRIEF DESCRIPTION OF THE DRAWINGS

The invention will be explained in more detail below using exemplary embodiments with reference to the figures. In the figures.

DETAILED DESCRIPTION OF THE INVENTION

Identical reference signs are used in the figures for elements of the invention that are identical or have the same effect. Furthermore, for the sake of clarity, only those reference signs are shown in the individual figures which are necessary for the description of the respective figure. Also, the invention is illustrated in the figures by schematic views. In particular, these schematic illustrations serve to explain the basic principle of the invention.

Figure 1:
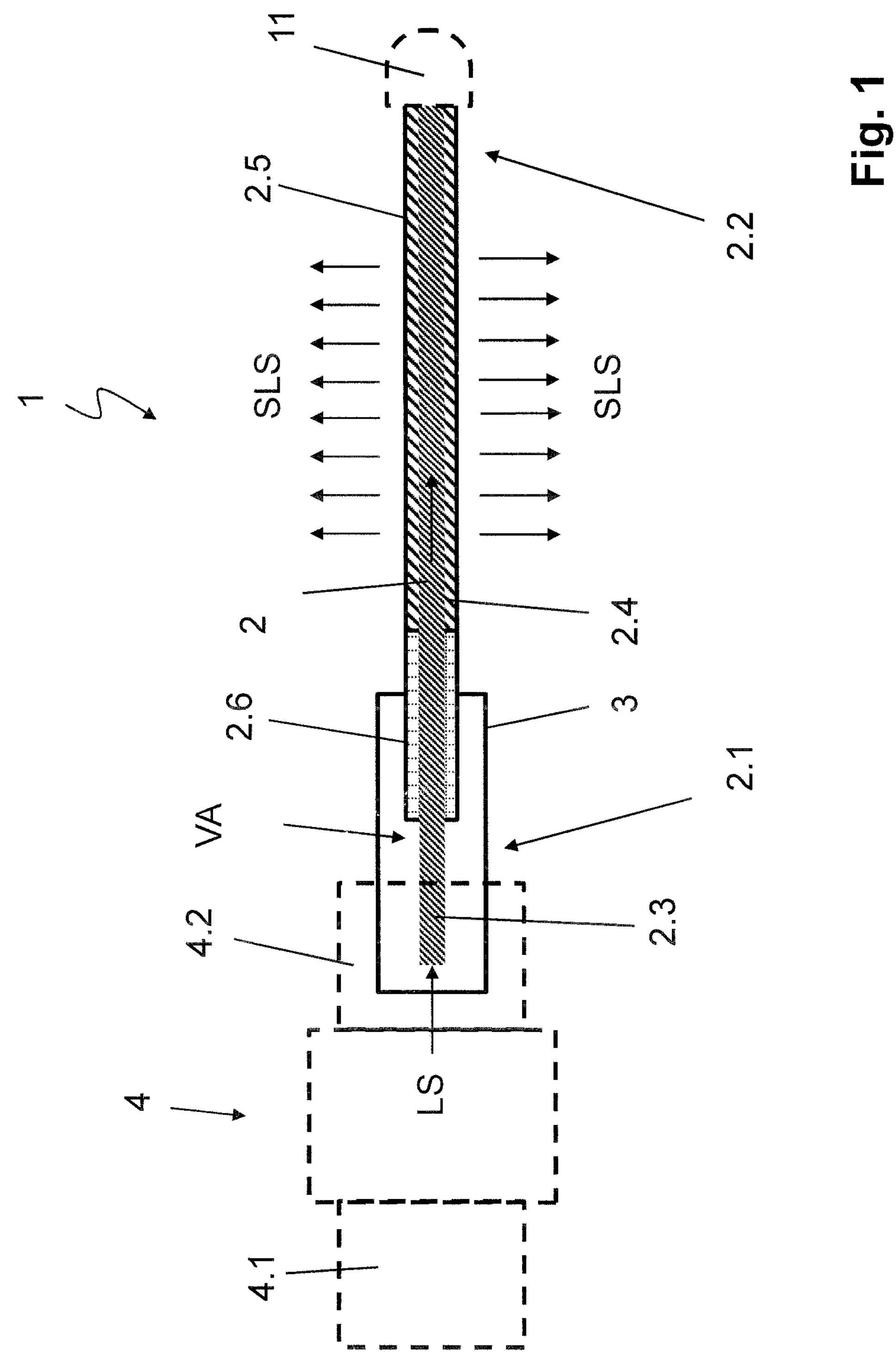
FIG. 1 shows a schematic block diagram of an optical fiber system according to the invention, comprising an optical fiber and at least one fiber connector.

FIG. 1 shows, by way of example, a schematic block diagram of an optical fiber system 1 according to the invention, comprising an optical fiber 2 for transporting optical radiation, in particular laser radiation LS, and a fiber connector 3 for coupling the optical radiation, in particular laser radiation LS, into the optical fiber 2.

The optical fiber 2 has a fiber input 2.1 and an opposite fiber output 2.2, wherein the optical radiation, preferably optical laser radiation LS, is coupled into the optical fiber 2 on the input side, i.e., in the region of the fiber input 2.1, and is coupled out again on the output side, i.e., in the region of the fiber output 2.2, after transmission via the optical fiber 2 has taken place, or is at least partially reflected back into the optical fiber 2, if necessary.

The coupled laser radiation LS is a high-energy optical radiation with a power of several watts, for example between 50 W and 10,000 W, preferably between 50 W and 1,000 W. Furthermore, the optical laser radiation LS has a spectral range or wavelength of 200 nm to 1,500 nm. Preferably, a laser radiation source for generating an optical laser radiation in the visible spectral range of 425 nm to 465 nm or in the near-infrared spectral range of 800 nm to 1,100 nm is used.

The optical fiber 2 is formed by a side- or radial-emitting optical fiber which is designed, on the one hand, for transporting the optical laser radiation LS along a propagation direction and, on the other hand, for side- or radial-emission of at least part of the optical laser radiation LS advancing in the propagation direction from the optical fiber 2 to the outside, namely a side-emitting or radial-emitting scattered laser radiation SLS. The propagation direction extends in each case along the longitudinal axis of the optical fiber 2.

The structure and the mode of operation of such side-emitting optical fibers 2 are basically known. Preferably, a side- or radial-emitting optical fiber 2 is used which is designed to be flexible in such a manner that it allows the optical fiber 2 to be bent by a bending radius of between 50 mm and 500 mm without damaging the optical fiber 2. The optical fiber 2 can thus be flexibly bent into different shapes and/or geometries even after the production process.

Such an optical fiber 2 has at least one fiber core 2.3, a scattering layer 2.4 surrounding the fiber core 2.3, and at least one cladding layer 2.5 surrounding the scattering layer 2.4. The fiber core 2.3 is made of glass, for example, preferably quartz glass, with a solid glass core preferably being used. In this case, depending on the application, the optical fiber 2 can have a total length between 1 m and 100 m, preferably between 1 m and 20 m. It is understood that the optical fiber 2 can have further layers, in particular cladding layers, in addition to the aforementioned layers, without thereby departing from the idea according to the invention.

The scattering layer 2.4 is formed by a cladding layer, also called "buffer", which surrounds the fiber core 2.3 and is made of plastic material, preferably acrylate, and comprises a plurality of scattering elements by which the side- or radial-emitting scattered laser radiation SLS is generated. The scattering elements are preferably made of aluminum oxide and the plastic material used, in particular acrylate of the scattering layer 2.4, is correspondingly enriched with aluminum oxide.

Figure 2:
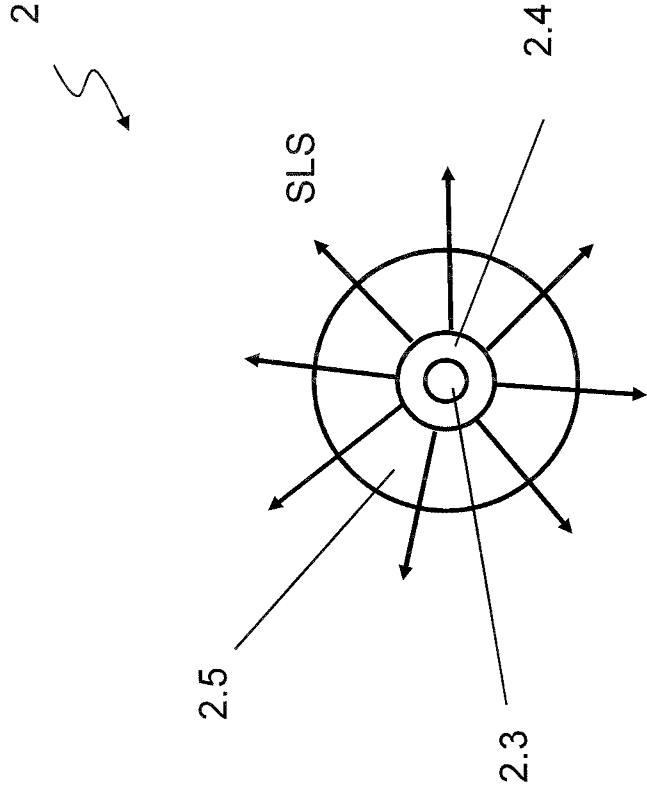
FIG. 2 shows a schematic cross-section through the side-emitting optical fiber of the optical fiber system.

This scattering layer 2.4 is further surrounded by at least one cladding layer 2.5, also called "jacket", which is made of plastic material, for example, polyamide or PTFE (polytetrafluoroethylene), and serves to protect the optical fiber 2 from external influences. This cladding layer 2.5 or, if necessary, further layers are to be removed accordingly to allow removal of the scattering layer 2.4 which interferes in the connecting section VA. FIG. 2 illustrates an example of a schematic section through a correspondingly designed optical fiber 2 in a greatly simplified manner.

At the fiber input 2.1, the optical fiber 2 has a connecting section VA at the free end or coupling side, which is designed to be received in a fiber connector 3 and to produce a mechanical connection therewith.

According to the invention, at least the scattering layer 2.4 of the optical fiber 2 and other layers surrounding it, such as the cladding layer 2.5, are removed in the connecting section VA at the free end or coupling side by stripping to suppress side-emitting scattered laser radiation SLS. This correspondingly stripped connecting section VA at the free end is adhesively bonded or otherwise mechanically connected to the fiber connector 3. In one embodiment of the invention, after removal of the scattering layer 2.4, a new cladding layer can be applied at least in sections onto the connecting section VA at the free end or coupling side, also referred to as "recoating" of the connecting section VA. Preferably, this is carried in such a manner that at least the region around the fiber facet remains exposed.

Stripping can be carried out, for example, mechanically by suitable blades made of metal or plastic, optionally using solvents. By removing the scattering layer 2.4, the generation of side-emitting scattered laser radiation SLS is effectively prevented in the connecting section VA, so that even if high-energy laser radiation LS is coupled into the optical fiber 2 via the fiber connector 3, damage to the fiber connector 3 due to scattered laser radiation SLS of the coupled-in high-energy optical laser radiation LS can be avoided. According to the invention, the exit of side-emitting scattered laser radiation SLS in the connecting section VA or in the fiber connector 3 is prevented by removing the scattering layer 2.4.

The fiber connector 3 forms an opto-mechanical interface of the optical fiber system 1 according to the invention, via which an improved coupling of high-energy optical laser radiation LS into the optical fiber 2 is possible. By the fiber connector 3, an opto-mechanical connection can be produced between a fiber coupling unit 4 and the side-emitting optical fiber 2. The fiber coupling unit 4, formed for example by a fiber-fiber coupler, is based on the collimation and focusing of the optical laser radiation LS on the input side, which is coupled as a free beam into the fiber facet of the side-emitting optical fiber 2.

The fiber connector 3 is a high-power connector for the multi-kW power range, which is basically available as connector types LLK-A, LLK-B and LLK-D (LLK, Lichtleitkabel, =fiber optic cable). Their structure and mode of operation are basically known. Particularly preferably, the fiber connector 3 is designed in the form of the LLK-D-type connector, and specifically, for example, as a conical connector. In the case of an LLK-D-type connector, the configuration of the mechanical interface is defined, in particular with regard to the shape and dimensions of the plug-in section and the connecting elements received therein.

In a preferred embodiment, this opto-mechanical interface formed by the fiber connector 3 comprises a temperature, plug-in and/or breakage monitoring device. Accordingly, the optical fiber 2 is also configured to provide the monitoring functionalities. The fiber connector 3 is further designed to produce an opto-mechanical connection with a fiber coupling unit 4 having an input-side fiber connector receptacle 4.1 and an output-side fiber connector receptacle 4.2. A corresponding fiber coupling unit 4 is indicated in FIG. 1 by a dashed line. For producing the detachable plug-in connection, the fiber connector 3 can be plugged into the fiber receptacle 4.2.

The fiber coupling unit 4 can include a continuation of the temperature, breakage, and plug-in monitoring of a transport fiber 6, 6' (discussed below in more detail), which interacts with the corresponding monitoring devices in the fiber connector 3, 3'. In addition, the fiber coupling unit 4 can include safety electronics which comprises a switching module, for example in the form of a relay, which opens a safety circuit of a transport fiber 6, 6' in the event of a fault. Sensors for condition monitoring and a control and evaluation unit for evaluating the sensor data obtained can also be provided in the fiber coupling unit 4. For example, photodiodes for scattered light detection and/or temperature sensors (e.g. NTCs (negative temperature coefficient thermistors)) for temperature monitoring and/or moisture sensors for tightness monitoring can be used as sensors.

In a preferred embodiment, the stripped free-end connecting section VA, and specifically at least the region adjoining the fiber facet, is mechanically and thermally connected to the fiber connector 3 by adhesive bonding, by a cylindrical connecting piece ("cartridge"), which is preferably made of metal or glass. The adhesive used is preferably an organic adhesive. A through-hole extending along the longitudinal axis of the cylinder is provided in the cylindrical connector, the diameter of which is aligned to receive the stripped connecting section VA.

The stripped connecting section VA at the free end of the optical fiber 2 is adhesively bonded in the through-hole of the cylindrical connecting piece and the connecting piece is mechanically connected to the fiber connector 3 or the housing of the fiber connector 3 in such a manner that both a mechanical and thermally conductive connection is formed between the connecting section VA and the fiber connector 3. In doing so, the fiber facet of the adhesively bonded connecting section VA is spaced apart from the free end of the fiber connector 3, 3', but is enclosed by the fiber receptacle 4.2 of the fiber coupling unit 4 after it has been inserted. For example, a detachable mechanical connection, in particular in the form of a screw connection, can be provided between the housing of the fiber connector 3 and the cylindrical connecting piece which is also part of the fiber connector 3.

In order to avoid damage to the bonding area by peripheral power components of the high-energy optical laser radiation LS, a pinhole element (not shown in the drawings) with a pinhole in which the inner diameter of the pinhole is only slightly larger than the diameter of the fiber core 2.3 of the side-emitting optical fiber 2 can additionally be arranged upstream of the fiber facet of the optical fiber 2 on the coupling side. In this case, peripheral power components of the high-energy optical laser radiation LS are to be understood to mean radiation components that cannot be coupled into the fiber core 2.3, but which enter the fiber connector 3 accordingly in the coupling region. The pinhole element is also received in the fiber connector 3.

The pinhole element can be disk-shaped, for example, and can have a reflecting, deflecting, scattering, or absorbing surface. Quartz glass, copper, or aluminum, for example, can be used to manufacture the pinhole element. In a preferred embodiment, the pinhole element has a high reflectance of at least 95% due to a dielectric, highly reflective coating. In an alternative embodiment, a pinhole element made of aluminum can be provided with a reflective surface by ultra-precision turning or ultra-precision milling.

Preferably, the fiber facet of the connecting section VA is arranged exposed in the housing of the fiber connector 3 and is protected by the housing in a direct lateral line of sight. Preferably, at least the front-end portion of the fiber connector 3 forming the plug-in connection is made of a high-melting material (>600° C.).

Figure 3:
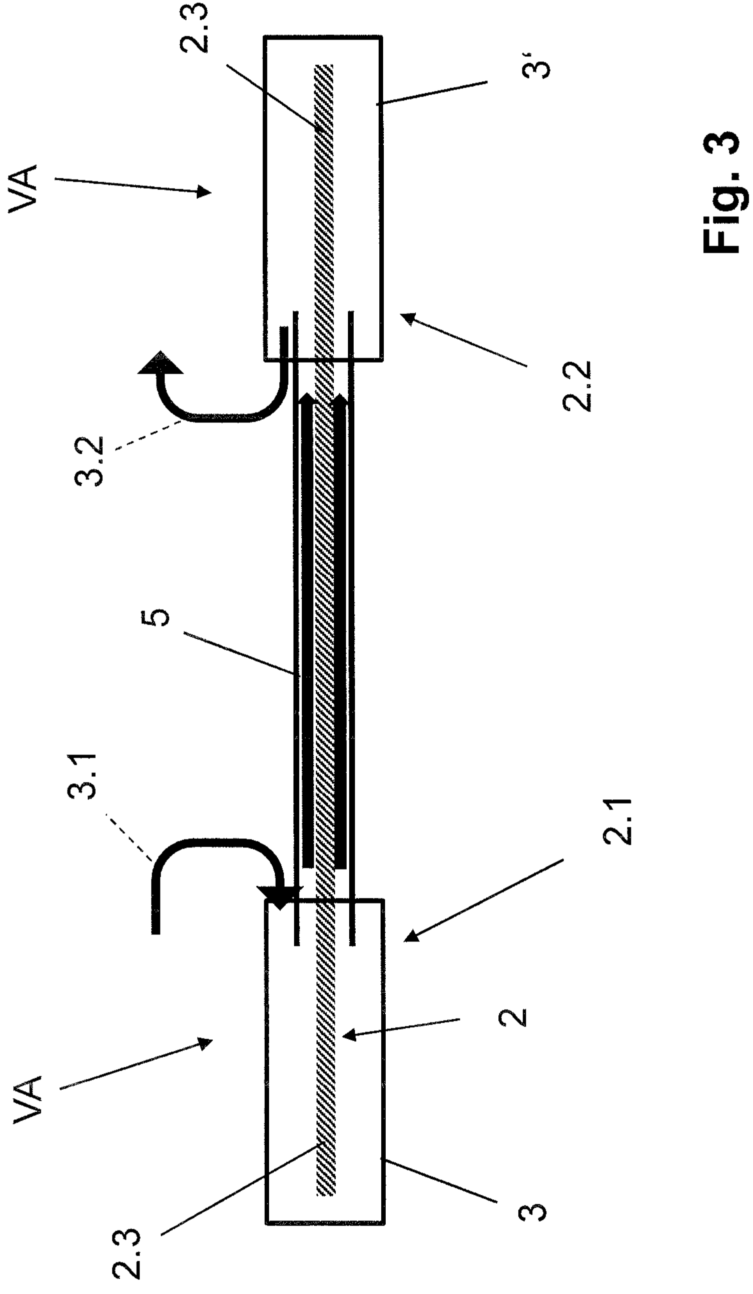
FIG. 3 shows a schematic block diagram of an alternatively designed optical fiber system with integrated liquid cooling in a greatly simplified illustration.

In an embodiment according to FIG. 3, the fiber connector 3 has liquid cooling, wherein liquid cooling of the optical fiber 2 can also be provided. For this purpose, a plurality of cooling channels is provided in the fiber connector 3, which are supplied with a cooling liquid and from which cooling liquid is removed again from the cooling circuit, respectively, via a common liquid supply and discharge. For example, water, preferably deionized water, can be used as the cooling liquid. In the connecting section VA, the fiber connector 3 preferably has a low thermal resistance to the cooling liquid.

For cooling the optical fiber 2, an enveloping cladding 5 surrounding the optical fiber is provided, which is in a fluid-tight connection with the fiber connector 3 (see FIG. 3). To allow the side-emitting scattered laser radiation SLS to pass through, the enveloping cladding 5 is transparent. Preferably, the enveloping cladding 5 is designed in a tube-like manner.

In the present exemplary embodiment according to FIG. 3, a fiber connector 3, 3' is provided both on the input side and on the output side, each of which is mechanically connected according to the invention to a connecting section VA at the free end of the optical fiber 2. The optical fiber 2 received in the enveloping cladding 5 is thus completely surrounded by the cooling liquid, i.e., a common cooling circuit is provided for cooling both the fiber connector 3, 3' and the optical fiber 2.

An inlet-side connection 3.1 and an outlet-side connection 3.2 are provided for the supply and discharge of the cooling liquid into and out of the respective cooling channels provided in the fiber connector 3, 3', wherein, for example, the cooling liquid is supplied via the input-side connection 3.1 to the cooling channels in the input-side fiber connector 3, which are in fluid connection with the enveloping cladding 5, via which the cooling liquid is guided for cooling the optical fiber 2 and is subsequently guided into the cooling channels of the output-side fiber connector 3'. From there, the cooling liquid is discharged again via the outlet connection 3.2.

In an alternative embodiment, supplying as well as discharging the coolant can be carried out via the input-side or output-side fiber connector 3, 3' which, accordingly, has both connections 3.1, 3.2. In this embodiment, the outlet-side fiber connector 3' can also be omitted and an alternative outlet-side diversion of the cooling liquid can be made.

Figure 4:
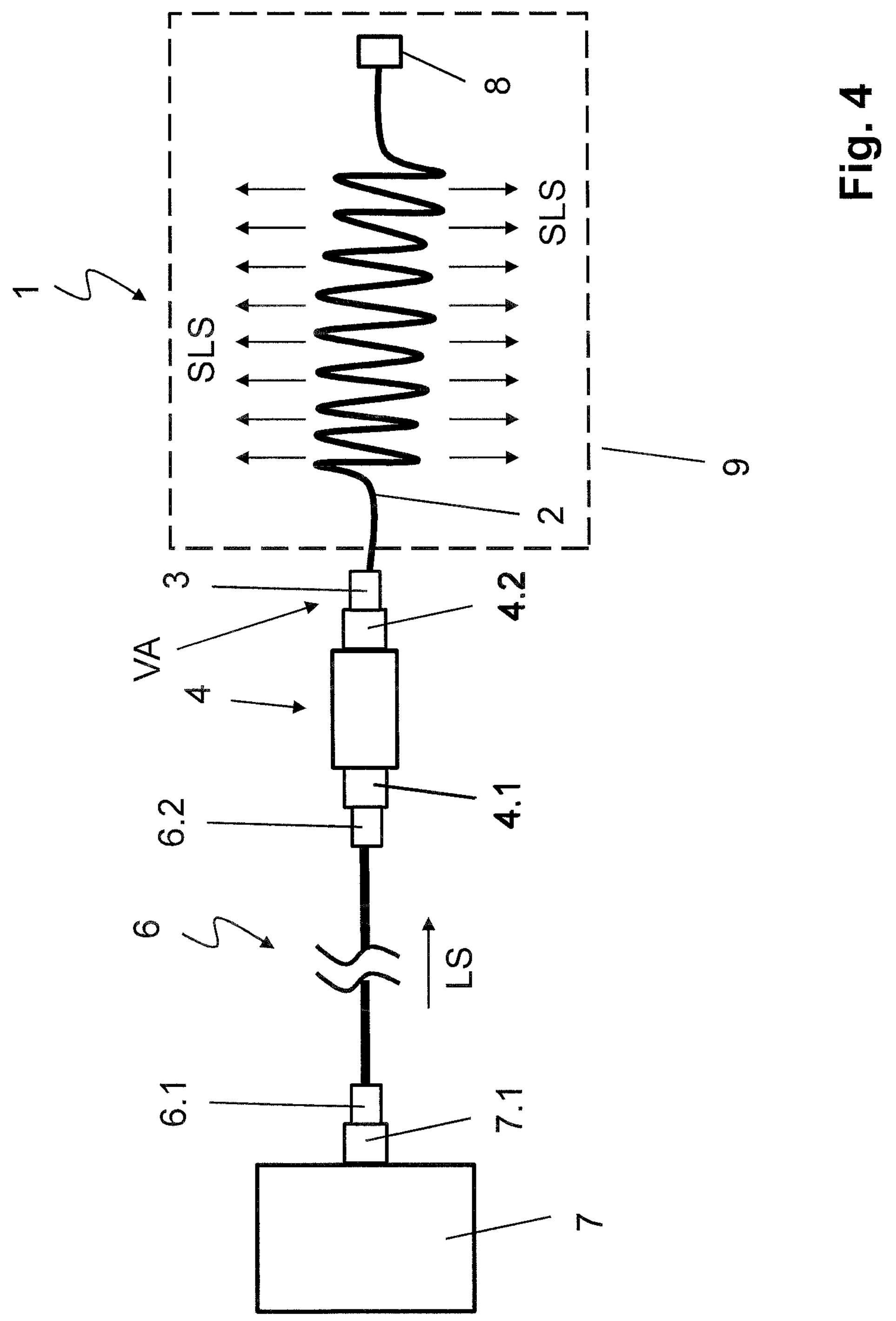
FIG. 4 shows a schematic block diagram of a laser system, comprising an optical fiber system according to the invention with upstream transport fiber and laser source.

FIG. 4 illustrates a schematic block diagram of a laser system with an optical fiber system 1 according to the invention and an upstream transport fiber 6 which is connected to the input-side fiber connector 3 of the optical fiber system 1 via a fiber coupling unit 4. The fiber coupling unit 4 forms a free-beam coupling element, which can be implemented, for example, in the form of a "fiber-to-fiber coupler".

The transport fiber 6 comprises a passive beam-guiding optical fiber, which is used to supply the laser radiation LS to the optical fiber system 1 according to the invention. For this purpose, the transport fiber 6 is connected on the input side to a laser source 7 which provides, for example, a laser radiation LS with a wavelength in the range between 400 nm and 1100 nm, preferably between 425 nm and 465 nm. The laser source 7 is preferably formed by a diode laser or a diode laser arrangement.

For connection to the laser source 7 as well as to the fiber coupling unit 4, the transport fiber 6 has a fiber connector 6.1, 6.2 on both the input and output side, which is connected to corresponding fiber connector receptacles 7.1, 4.1 of the laser source 7 and the fiber coupling unit 4, respectively.

The laser source 7, the transport fiber 6 and the side-emitting optical fiber 2 of the optical fiber system 1 are thus connected in series. This serves to spatially separate the place of generation of the laser radiation LS and the place of application of the laser radiation LS or the scattered laser radiation SLS.

For cost reduction and in case of shorter distances between the place of generation of the laser radiation LS and the place of application of the laser radiation LS and/or lower requirements on laser safety, the provision of a laser fiber coupling unit 4 can be dispensed with. The transport fiber (or passive beam-guiding optical fiber) 6 is then designed as a single piece or monolithically, namely implemented by the side-emitting optical fiber 2. For this purpose, the scattering layer 2.4 and the cladding layer 2.5 are removed in the coupling-side section of the optical fiber 2 forming the transport fiber 6, and subsequently, a new cladding layer 2.6 made of a plastic material without scattering elements ("polymer coating") is applied onto the coupling-side stripped section of the side-emitting optical fiber 2. Thus, a so-called "recoating" with acrylates or silicones without scattering elements takes place.

In FIG. 1, a new cladding layer 2.6 is shown which adjoins the original cladding layer 2.5 and encloses a segment of the stripped connecting section VA. The new cladding layer 2.6 also extends, at least in sections, into the fiber connector 3.

The laser source 7 is preferably formed by a semiconductor laser or a semiconductor laser arrangement, in particular a diode laser or a diode laser arrangement with fiber coupling, having optical output power of 50 W to 1,000 W. The laser source 7 can be operated in a continuous and pulsed mode.

The laser radiation LS generated by the laser source 7 is coupled into the transport fiber 6 and transmitted to the fiber coupling unit 4 via which, in turn, the coupling into the optical fiber system 1 according to the invention or its side-emitting optical fiber 2 takes place. In the embodiment illustrated in FIG. 4, the side-emitting optical fiber 2 has an output-side end reflector 8 which reflects the outgoing radiation components of the transported laser radiation LS back into the optical fiber 2, whereby the power and/or homogeneity of the side-emitting scattered laser radiation SLS can be increased.

According to one embodiment, at least the side-emitting optical fiber 2 of the optical fiber system 1 according to the invention can be received in a process chamber 9 in which the generated scattered laser radiation SLS is used to perform application-specific processes. For example, the process chamber 9 can be part of a photochemical reactor, in particular for irradiating a material or workpiece. For example, the process chamber 9 can be formed by a reactor tube in which the side-emitting optical fiber 2 is received.

In the present exemplary embodiment according to FIG. 4, the side-emitting optical fiber 2 received in the process chamber 9 has, at least in sections, a spiral arrangement which, for example, can be spirally wound onto a reactor tube not shown in FIG. 4. Double or helical arrangements of the side-emitting optical fiber 2 are also possible.

The aforementioned spatial arrangements of the side-emitting optical fiber 2 in the process chamber 9 serve to illuminate the workpieces, components or chemicals to be treated as homogeneously as possible, the treatment of which can take place either inside or outside the spiral-shaped arrangement.

Figure 5:
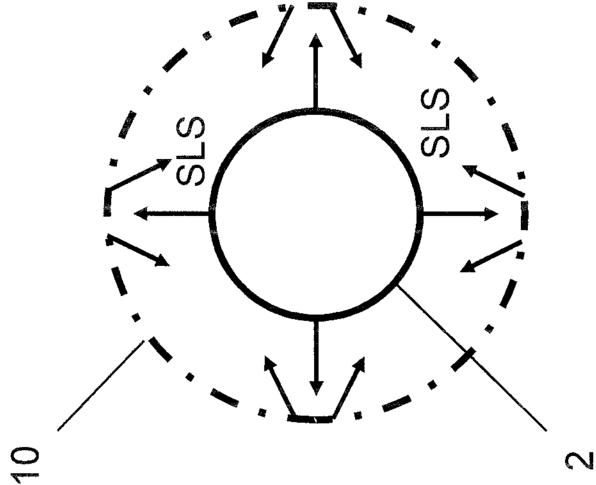
FIG. 5 shows a schematic cross-section through an optical fiber with reflective cladding.

The inside of the process chamber 9 or any other sheathing 10 receiving the side-emitting optical fiber 2 can also be designed to be reflective. For this purpose, for example, a reflective coating can be provided, for example, by vapor deposition of an aluminum layer or similar reflective materials. This further increases the degree of homogenization of the generated scattered laser radiation SLS. FIG. 5 shows a greatly simplified schematic sectional view of the reflection of the scattered laser radiation SLS on the reflective sheathing 10.

To further increase the degree of homogenization of the scattered laser radiation SLS, an end cap element 11 can be provided on the output side or at the fiber output 2.2 of the side-emitting optical fiber 2, which end cap element forms a spherical mirror that reflects the outgoing radiation components of the transported laser radiation LS back into the optical fiber 2. The output-side fiber facet of the side-emitting optical fiber 2 is preferably arranged at the focal point of the spherical mirror, namely with a maximum offset of +/−0.5 mm. The mirror is preferably made of quartz glass and has a diameter in the range between 4 mm and 12 mm.

Particularly preferably, the end cap element 11 forms a highly reflective spherical or paraboloid end cap with the aforementioned mirror properties to increase the degree of homogenization. The region between the fiber facet and the mirror surface is filled, for example, by a cylindrically shaped component of the end cap element 11. To provide a high degree of reflection, a dielectric, highly reflective coating is provided. Preferably, a "broadband coating" is used for this purpose to compensate for the layer thickness variation caused by the small radius of curvature of the mirror when the coating grows thereon. A precise adjustment of the end cap element 11 transverse to the longitudinal axis of the optical fiber 2 is crucial, namely in such a manner that the fiber core 2.3 and the mirror axis are arranged as concentric as possible to each other. After the described adjustment, the end cap element 11 is spliced to the optical fiber 2, wherein the splicing can be carried out by commercially available carbon dioxide, hydrogen, or arc splicers.

The side-emitting optical fiber 2 is also stripped before or in the connection section with the end cap element 11, for example over a length of between 10 mm and 100 mm, to avoid, on the one hand, heating of the end cap element 11 caused by the side-emitted scattered laser radiation SLS and, on the other hand, contamination of the splice point by melted plastic residues.

In a particularly preferred embodiment, the free output-side end of the side-emitting optical fiber 2 is also received in a fiber connector 3, which is particularly preferably implemented according to the LLK-D-type connector.

Figure 6:
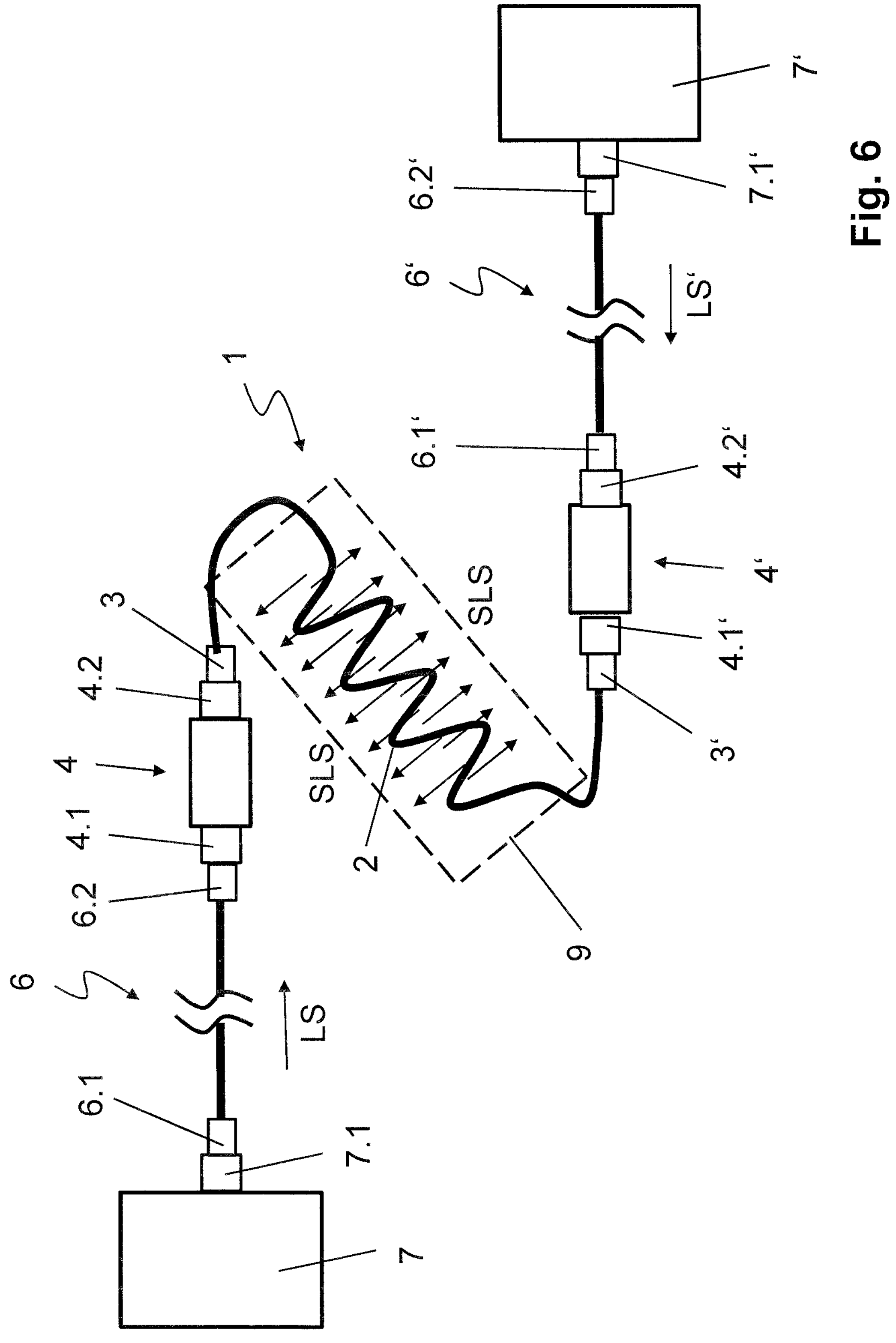
FIG. 6 shows a schematic block diagram of a laser system, comprising an optical fiber system according to the invention with upstream and downstream transport fiber and two laser sources.

FIG. 6 shows another embodiment of the optical fiber system 1 according to the invention, in which a dual-side, i.e., an input-side as well as an output-side coupling of a laser radiation LS, LS' into the side-emitting optical fiber 2 takes place. For this purpose, in addition to the arrangement shown in FIG. 4, a further laser source 7' is also provided on the output side, via which another laser radiation LS' is generated. On the coupling side, according to the invention, a further fiber connector 3' is provided in a connecting section VA, which is mechanically connected to the optical fiber 2 by adhesive bonding. Here too, both the scattering layer 2.4 and the cladding layer 2.5 are removed in the connecting section VA for suppressing the scattered laser radiation SLS. The further laser source 7' is connected, for example, directly or via an additional transport fiber 6' via a further fiber coupling unit 4' to the side-emitting optical fiber 2 of the optical fiber system 1. Analogous to FIG. 4, the further fiber coupling unit 4' comprises corresponding fiber connector receptacles 4.1', 4.2' and the further transport fiber 6' comprises corresponding fiber connectors 6.1', 6.2', wherein the further laser source 7' also has a fiber connector receptacle 7.1'.

Figure 7:
FIG. 7 shows a schematic side view of the conical plug-in section of a fiber connector.
Figure 7:
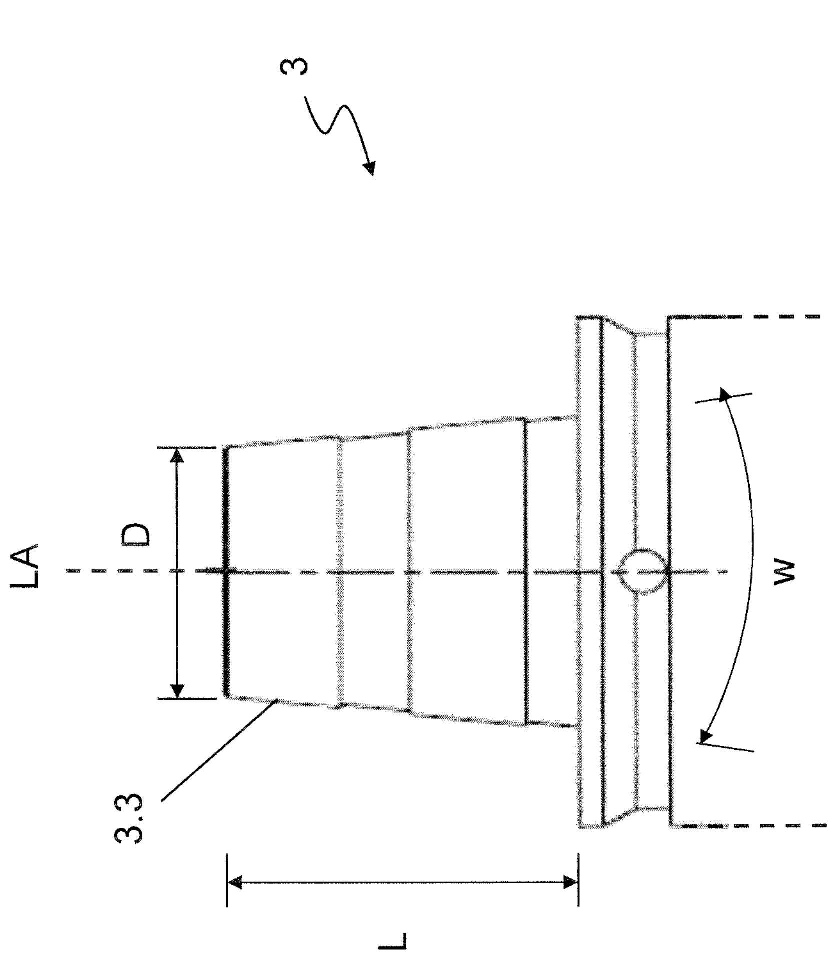

FIG. 7 shows a schematic illustration of a detail of the truncated connecting area of the fiber connector 3, 3', which has a truncated connecting piece 3.1 at the free end that extends along the longitudinal axis LA of the connector. The truncated connecting piece 3.1 has, for example, an opening angle of approximately 12°, a minimum diameter D of 17.6 mm, and a length L of 23 mm.

The invention has been described above with reference to exemplary embodiments. It is understood that numerous changes as well as modification of the fiber laser arrangement according to the invention are possible without thereby departing from the inventive idea underlying the invention.

REFERENCE LIST

1 optical fiber system
2 optical fiber
2.1 fiber input
2.2 fiber output
2.3 fiber core
2.4 scattering layer
2.5 cladding layer
2.6 new cladding layer
3, 3' fiber connector
3.1 connection
3.2 connection
3.3 truncated connecting piece
4, 4' fiber coupler
4.1, 4.1' fiber connector receptacle
4.2, 4.2' fiber connector receptacle
5 enveloping cladding
6, 6' transport fiber
6.1, 6.1' fiber connector
6.2, 6.2' fiber connector
7, 7' laser source
7.1, 7.1' fiber connector receptacle
8 end reflector
9 process chamber
10 reflective sheathing
11 end cap element
D diameter
L length
LA longitudinal connector axis
LS, LS' laser radiation
SLS scattered laser radiation
w opening angle

What is claimed is:

1. An optical fiber system for generating a side-emitting optical scattered laser radiation from a coupled optical laser radiation comprising: at least one side-emitting optical fiber with a fiber input and a fiber output, wherein the side-emitting optical fiber has at least one fiber core, a scattering layer surrounding the fiber core, and at least one cladding layer surrounding the scattering layer, wherein by the scattering layer, the side-emitting optical scattered laser radiation is generated from the coupled optical laser radiation coupled into the side-emitting optical fiber, and wherein a coupling-side connecting section of the side-emitting optical fiber at the fiber input is received in a fiber connector and produces a mechanical connection to the fiber connector, wherein at least the scattering layer and the at least one cladding layer are removed by stripping to suppress the side-emitting scattered laser radiation in the coupling-side connecting section.

2. The optical fiber system according to claim 1, wherein the fiber connector is mechanically and thermally connected to the coupling-side connecting section by an adhesive bond.

3. The optical fiber system according to claim 2, wherein an organic adhesive is used to produce the adhesive bond.

4. The optical fiber system according to claim 2, wherein the coupling-side connecting section is received in the fiber connector and is adhesively bonded thereto.

5. The optical fiber system according to claim 1, wherein at least one fiber coupling unit with an input-side fiber receptacle and an output-side fiber receptacle is provided, wherein the fiber receptacles produce a mechanical plug-in connection with the fiber connector.

6. The optical fiber system according to claim 5, wherein the fiber coupling unit is a fiber-fiber coupler.

7. The optical fiber system according to claim 5, wherein the fiber connector or the fiber coupling unit has a temperature, plug-in, or breakage monitoring device.

8. The optical fiber system according to claim 1, wherein the connecting section forms an opto-mechanical interface for coupling high-energy, optical laser radiation.

9. The optical fiber system according to claim 1, wherein the side-emitting optical fiber is flexible in such a manner that bending within a bending radius between 50 mm and 500 mm is possible without causing damage.

10. The optical fiber system according to claim 1, wherein the scattering layer is made of an acrylate, and comprises a plurality of scattering elements by which the side-emitting optical scattered laser radiation is generated from the coupled optical laser radiation transported in the fiber core.

11. The optical fiber system according to claim 10, wherein the scattering elements are made of a ceramic aluminum oxide, and the acrylate used to produce the scattering layer is correspondingly enriched with the scattering elements made of the ceramic aluminum oxide.

12. The optical fiber system according to claim 1, wherein the side-emitting optical fiber has a coupling-side fiber facet.

13. The optical fiber system according to claim 1, wherein the fiber connector is an LLK-D-type connector or is made of plastics or metal.

14. The optical fiber system according to claim 1, wherein at least a segment of the coupling-side connecting section of the side-emitting optical fiber is provided with a new cladding layer made of a plastic material without scattering elements.

15. The optical fiber system according to claim 1, wherein at the fiber output of the side-emitting optical fiber, an end cap element is arranged which forms a spherical mirror that reflects portions of a laser radiation emerging back into the side-emitting optical fiber.

16. The optical fiber system according to claim 1, wherein the side-emitting optical fiber is received in a process chamber and the side-emitting optical fiber received in the process chamber is arranged in a spiral-shaped manner.

17. The optical fiber system according to claim 16, wherein an inner side of the process chamber or a sheathing receiving the side-emitting optical fiber is reflective.

18. The optical fiber system according to claim 1, wherein the coupled optical laser radiation is high-energy, and has a power of between 50 watts and 10,000 watts, or a wavelength of between 200 nm to 1,500 nm.

19. A laser system comprising at least one laser source for providing the coupled optical laser radiation and an optical fiber system for generating the side-emitting optical scatter laser radiation from the coupled optical laser radiation according to claim 1, and at least one fiber coupling unit for coupling the coupled optical laser radiation provided by the laser source into the side-emitting optical fiber of the optical fiber system.

20. The laser system according to claim 19, wherein the laser source is formed by a semiconductor laser or a semiconductor laser arrangement selected from a diode laser or a diode laser arrangement.

21. The laser system according to claim 19, further including a transport fiber comprising a combination of a passive beam-guiding optical fiber and a fiber connector.

* * * * *